(12) United States Patent
Choi et al.

(10) Patent No.: US 10,946,864 B2
(45) Date of Patent: Mar. 16, 2021

(54) APPARATUS AND METHOD FOR FAULT DIAGNOSIS AND BACK-UP OF ADVANCED DRIVER ASSISTANCE SYSTEM SENSORS BASED ON DEEP LEARNING

(71) Applicant: Industry-Academic Cooperation Foundation, Dankook University, Yongin-si (KR)

(72) Inventors: Sang-Il Choi, Seoul (KR); Haanju Yoo, Seoul (KR)

(73) Assignee: Industry-Academic Cooperation Foundation, Dankook University, Yongin-si (KR)

( * ) Notice: Subject to any disclaimer, the term of this patent is extended or adjusted under 35 U.S.C. 154(b) by 204 days.

(21) Appl. No.: 16/191,577

(22) Filed: Nov. 15, 2018

(65) Prior Publication Data
US 2019/0276041 A1    Sep. 12, 2019

(30) Foreign Application Priority Data
Mar. 6, 2018    (KR) .................... 10-2018-0026490

(51) Int. Cl.
*B60W 50/02*     (2012.01)
*B60W 50/029*    (2012.01)
(Continued)

(52) U.S. Cl.
CPC ...... *B60W 50/0205* (2013.01); *B60W 50/029* (2013.01); *G05B 23/024* (2013.01);
(Continued)

(58) Field of Classification Search
CPC .......... B60W 50/0205; B60W 50/029; B60W 50/0225; B60W 2050/0215;
(Continued)

(56) References Cited

U.S. PATENT DOCUMENTS 5,548,597 A * 8/1996 Kayama ............... G05B 23/024
                                                                714/736
9,221,396 B1 * 12/2015 Zhu .......................... G01S 7/40
(Continued)

FOREIGN PATENT DOCUMENTS

JP        2008-269215 A     11/2008
KR    10-2015-0011620 A      2/2015
(Continued)

OTHER PUBLICATIONS

Cadena, Cesar et al., "Multi-modal auto-encoders as joint estimators for robotics scene understanding", Robotics: Science and Systems XII, Jun. 18-Jun. 22, 2016, University of Michigan, ISBN 978-0-9923747-2-3, 9 pages (Year: 2016).*

(Continued)

*Primary Examiner* — Faris S Almatrahi
*Assistant Examiner* — David A Testardi
(74) *Attorney, Agent, or Firm* — Paratus Law Group, PLLC (57) ABSTRACT

An apparatus for fault diagnosis and back-up of advanced driver assistance system sensors based on deep learning, the apparatus including: an individual sensor diagnosis unit configured to quantitatively evaluate a reliability of an output result of each sensor at each moment on the basis of a model for an output of each sensor under a normal operation; an inter-sensor mutual diagnosis unit configured to extract shared representation between the sensors and quantitatively evaluate a normal-operation reliability of the output result of each sensor on the basis of the extracted shared representation; and an integrated diagnosis unit configured to quantitatively evaluate a final reliability of each sensor on the basis of output results of the individual sensor diagnosis unit and the inter-sensor mutual diagnosis unit.

13 Claims, 6 Drawing Sheets

(51) Int. Cl.
*G05B 23/02* (2006.01)
*G06N 20/00* (2019.01)
*G06N 3/08* (2006.01)
*G06N 5/04* (2006.01)
*G07C 5/08* (2006.01)

(52) U.S. Cl.
CPC .............. *G06N 3/08* (2013.01); *G06N 5/046* (2013.01); *G06N 20/00* (2019.01); *G07C 5/0808* (2013.01); *B60W 2050/0215* (2013.01); *B60W 2050/0292* (2013.01)

(58) Field of Classification Search
CPC ........ B60W 2050/0292; G06N 3/0454; G06N 20/00; G05D 1/0088; G05D 1/0246; G05D 1/0248; G05D 1/0255; G05D 1/0257; G05B 23/024
See application file for complete search history.

(56) References Cited

U.S. PATENT DOCUMENTS

| | | | | |
|---|---|---|---|---|
| 9,855,894 | B1* | 1/2018 | Khorasani | G06K 9/00805 |
| 2004/0230368 | A1* | 11/2004 | Kropinski | G05B 23/024 |
| | | | | 701/114 |
| 2010/0023205 | A1* | 1/2010 | Schmitt | B60W 50/045 |
| | | | | 701/29.2 |
| 2011/0153035 | A1* | 6/2011 | Grichnik | G05B 23/024 |
| | | | | 700/21 |
| 2015/0363925 | A1* | 12/2015 | Shibuya | G06K 9/6272 |
| | | | | 345/440 |
| 2016/0110932 | A1* | 4/2016 | Klein | B60W 50/00 |
| | | | | 701/30.3 |
| 2016/0358088 | A1* | 12/2016 | Lemmer | G06N 3/126 |
| 2016/0379067 | A1* | 12/2016 | May | G06K 9/00805 |
| | | | | 382/103 |
| 2017/0169627 | A1* | 6/2017 | Kim | G01S 7/497 |
| 2017/0185078 | A1* | 6/2017 | Weast | G05B 23/0297 |
| 2017/0206464 | A1* | 7/2017 | Clayton | G06N 3/0445 |
| 2017/0370985 | A1* | 12/2017 | Rachmawati | G05B 23/0227 |
| 2017/0371329 | A1* | 12/2017 | Giering | G06T 7/248 |
| 2018/0025558 | A1* | 1/2018 | Chen | B60W 50/0205 |
| | | | | 701/29.7 |
| 2018/0082150 | A1* | 3/2018 | Itou | G06K 9/6248 |
| 2018/0173971 | A1* | 6/2018 | Jia | G06K 9/6288 |
| 2018/0275658 | A1* | 9/2018 | Iandola | G06F 30/20 |
| 2018/0349785 | A1* | 12/2018 | Zheng | G06N 5/02 |
| 2018/0365089 | A1* | 12/2018 | Okanohara | G06N 7/00 |
| 2019/0025773 | A1* | 1/2019 | Yang | G06K 9/036 |
| 2019/0049958 | A1* | 2/2019 | Liu | G06N 3/02 |
| 2019/0065933 | A1* | 2/2019 | Bogdoll | G06F 30/20 |
| 2019/0135300 | A1* | 5/2019 | Gonzalez Aguirre | |
| | | | | G06N 3/088 |
| 2019/0258878 | A1* | 8/2019 | Koivisto | G05D 1/00 |
| 2019/0293462 | A1* | 9/2019 | Choi | G01D 3/08 |
| 2020/0200869 | A1* | 6/2020 | Alvarez | G01S 7/497 |

FOREIGN PATENT DOCUMENTS

| | | |
|---|---|---|
| KR | 10-2017-0068059 A | 6/2017 |
| KR | 10-1786237 B1 | 10/2017 |
| WO | WO 2017/094267 A1 | 6/2017 |

OTHER PUBLICATIONS

Guizilini, Vitor et al., "Learning to Reconstruct 3D Structures for Occupancy Mapping", Robotics: Science and Systems XIII, Jul. 12-Jul. 16, 2017, Massachusetts Institute of Technology, ISBN 978-0-9923747-3-0, 10 pages (Year: 2017).*

Liu, Hailong, "Defect-Repairable Latent Feature Extraction of Driving Behavior via a Deep Sparse Autoencoder", Sensors 2018, 18, 608; Feb. 16, 2018, doi:10.3390/s18020608, MDPI, 27 pages (Year: 2018).*

Ma, Meng et al., "Deep Coupling Autoencoder for Fault Diagnosis With Multimodal Sensory Data", IEEE Transactions on Industrial Informatics, vol. 14, No. 3, Mar. 2018, pp. 1137ff (Year: 2018).*

Wikipedia article, "On-board diagnostics", Old revision dated Feb. 21, 2018, 14 pages (Year: 2018).*

Korean Office Action for related KR Application No. 10-2018-0026490 dated Mar. 8, 2019 from Korean Intellectual Property Office.

Korean Notice of Allowance for related KR Application No. 10-2018-0026490 dated Apr. 1, 2019 from Korean Intellectual Property Office.

* cited by examiner

APPARATUS AND METHOD FOR FAULT DIAGNOSIS AND BACK-UP OF ADVANCED DRIVER ASSISTANCE SYSTEM SENSORS BASED ON DEEP LEARNING

CROSS-REFERENCE TO PRIOR APPLICATION

This application claims priority from and the benefit of Korean Patent Application No. 10-2018-0026490 filed on Mar. 6, 2018, which is hereby incorporated by reference in its entirety.

BACKGROUND

1. Technical Field

The present invention relates to an advanced driver assistance system (ADAS), and more specifically, to an apparatus and method for fault diagnosis and back-up of ADAS sensors based on deep learning, capable of performing efficient and comprehensive sensor verification using a mutual verification method through information shared between the sensors.

2. Related Art

Recently, various advanced driver assistance systems (ADAS) have been developed and used for convenience and safety of drivers.

For example, various systems are being applied to vehicles, such as smart cruise control (SCC) that is designed to automatically adjust the vehicle speed while maintaining a predetermined distance by recognizing a vehicle ahead, lane keeping assist system (LKAS) that is designed to, at a time of a driver's unintentional lane departure unless a turn signal is turned on, assist the vehicle in returning back to the lane by controlling steering, and smart parking assist system (SPAS) that is designed to recognize a parking space and park for a driver, and the use of the systems is increasing with further applications and functions.

These systems are equipped with various sensors, such as radars, LiDARs, cameras, and ultrasonic sensors, and the like, that recognize a driving environment of a driver and assist the driver according to the driving situation, providing functions that serve as the eyes of a driver.

ADAS performs auxiliary control in regard to acceleration/deceleration or steering of the vehicle on the basis of information about various surrounding environments such as the distance and speed acquired through sensors.

Accordingly, ADAS needs to have a function for determining a failure of a sensor in real time and correcting the error.

In the ADAS, a sensor serves as only a channel identifying the external environment. When a sensor and a sensing information transport system have an error, serious defects may be inevitable for the ADAS system.

In addition, as for the ADAS developing toward autonomous navigation systems, the use of various and a high quantity of sensors is inevitable. To this end, an automated algorithm that can effectively verify a large quantity of sensor data is needed.

In addition, in many cases, even when an abnormal operation of the sensor is detected, the operation may be not immediately stopped depending on the driving situation.

In addition, it is important to increase the capability of a vehicle to be movable for repair, as further development of technology is expected to increase a number of vehicle users who are unskilled at manual driving.

Accordingly, there is a need for technology development of a back-up algorithm in which, when a malfunction of some sensors is detected, the sensors are complemented.

In particular, there is a need for technology development for mutual verification between the sensors.

It is substantially difficult and inefficient to secure all verification cases that need to be considered with respect to various sensor operating environments, such as the region, the time, and the weather.

In many cases, sensors have recognition areas overlapping each other, and unless recognition areas overlap, there are many factors exerting a common influence on sensors, such as weather and illumination information.

Since a number of sensors are not likely to fail at the same time, except for a case of large scale damage, there is a need to introduce a method for mutual verification through information shared between the sensors such that more efficient and comprehensive sensor verification is provided.

RELATED ART DOCUMENT

Patent Document

Korean Laid-open Patent Publication No. 10-2017-0068059
Korean Laid-open Patent Publication No. 10-2015-0011620

SUMMARY

The present invention is directed to providing an apparatus and method for fault diagnosis and back-up of advanced driver assistance system (ADAS) sensors based on deep learning, capable of performing efficient and comprehensive sensor verification using a mutual verification method through information shared between the sensors.

The present invention is directed to providing an apparatus and method for fault diagnosis and back-up of ADAS sensors based on deep learning, capable of coping with various environmental situations and fault situations by determining the presence of a fault in each sensor on the basis of deep understanding of surrounding environments identified through multi sensors, rather than performing diagnosis on the basis of a predetermined fault list.

The present invention is directed to providing an apparatus and method for fault diagnosis and back-up of ADAS sensors based on deep learning, capable of increasing the accuracy of sensor fault diagnosis by using a sensor fault diagnosis configuration that determines a normal operation of a main sensor of ADAS on the basis of a probability statistical approach.

The present invention is directed to providing an apparatus and method for fault diagnosis and back-up of ADAS sensors based on deep learning, capable of increasing the reliability of ADAS by applying a sensor complement configuration that predicts a normal output of the faulty sensor using normal-operation sensors, except for the sensor, when a faulty sensor is found during operation of an ADAS function.

The present invention is directed to providing an apparatus and method for fault diagnosis and back-up of ADAS sensors based on deep learning, capable of increasing the accuracy of individual sensor diagnosis by introducing a model for an output of each sensor under a normal operation and quantitatively evaluating a reliability of a sensor output result at each moment on the basis of the introduced model with a value ranging from 0 to 1.

The present invention is directed to providing an apparatus and method for fault diagnosis and back-up of ADAS sensors based on deep learning, capable of constructing a high reliability diagnosis system by applying a normal-operation reliability of each sensor that is measured by an individual sensor diagnosis to an inter-sensor mutual diagnosis algorithm.

The present invention is directed to providing an apparatus and method for fault diagnosis and back-up of ADAS sensors based on deep learning, capable of achieving the accuracy of reliability determination by reducing an influence of a sensor that is measured to have a low reliability in an individual sensor diagnosis on a process of extracting shared representation between the sensors, to minimize the influence of the sensor on the determination of reliabilities of other sensors that operate normally.

The technical objectives of the present invention are not limited to the above, and other objectives may become apparent to those of ordinary skill in the art based on the following descriptions.

According to one aspect of the present invention, there is provided an apparatus for fault diagnosis and back-up of advanced driver assistance system (ADAS) sensors based on deep learning, the apparatus including: an individual sensor diagnosis unit configured to quantitatively evaluate a reliability of an output result of each sensor at each moment on the basis of a model for an output of each sensor under a normal operation; an inter-sensor mutual diagnosis unit configured to extract shared representation between the sensors and quantitatively evaluate a normal-operation reliability of the output result of each sensor on the basis of the extracted shared representation; and an integrated diagnosis unit configured to quantitatively evaluate a final reliability of each sensor on the basis of output results of the individual sensor diagnosis unit and the inter-sensor mutual diagnosis unit.

The apparatus may operate in a multi-modal sensor network that combines multi-type sensors.

The individual sensor diagnosis unit may include: an information compressor configured to compress the outputs of the sensors output at each time into feature vectors; an individual input reliability meter configured to measure the reliability of the sensor on the basis of each of the feature vectors; a dynamic information reliability meter configured to measure the reliability of the sensor on the basis of a dynamic relationship between the feature vectors generated consecutively; and a final reliability meter configured to quantitatively evaluate the final reliability on the basis of output results of the individual input reliability meter and the dynamic information reliability meter.

The information compressor may be combined with a configuration of an auto-encoder for data compression and a configuration of a convolutional neural network (CNN) for image data compression among deep learning models.

The individual input reliability meter may use multi-layer perceptron for non-linear inference.

The dynamic information reliability meter may have a long short-term memory (LSTM) structure of a recurrent neural network (RNN) to analyze time series data among deep learning models.

The individual sensor diagnosis unit may measure a detection rate for items of a fault situation including a sensor blackout and a data update delay of each of the sensors, a sensor occlusion by a foreign substance, and a backlight occurrence of a camera sensor.

The apparatus may perform reconstruction of an output of a depth camera for sensor complementation and may further include a configuration which reconstructs a depth region from information of image camera operating normally and determines a normal reconstruction depending on whether a difference between a reconstructed depth and an actual depth for each pixel falls within a predetermined range.

The inter-sensor mutual diagnosis unit may include: a shared representation extractor configured to extract shared representation from the sensors except for a verification target sensor; a sensor output predictor configured to return an output prediction value that is expected to be output from the verification target sensor from the extracted shared representation; and a sensor output verifier configured to calculate the final reliability by comparing a result obtained from the sensor output predictor with an actual output for the verification target sensor.

The shared representation extractor may have a multi-modal deep auto-encoder (MMDAE) structure for analysis of non-linear relationship between pieces of data.

The sensor output predictor may learn an MMDAE used in the shared representation extractor using a denoising method such that the MMDAE has an output value without an input of the corresponding sensor, to thereby obtain an output value of the sensor desired to be predicted.

To prevent the output of the sensor and the result of the sensor output predictor from mismatching each other due to an output error of an MMDAE based algorithm even for a sensor operating normally, the sensor output verifier may have a multi-layer perceptron based regressor structure that calculates the reliability according to a difference between the output of the sensor and the result of the sensor output predictor.

With regard to the sensor that is measured to have a low reliability in the individual sensor diagnosis unit, the integrated diagnosis unit may reduce a weight on the sensor in a process of extracting shared representation between the sensors such that an influence of the sensor is minimized on the determination of reliabilities of other sensors.

According to another aspect of the present invention, there is provided a method for fault diagnosis and back-up of advanced driver assistance system (ADAS) sensors based on deep learning, in a multi-modal sensor network that combines multi-type sensors, the method including: diagnosing each sensor for quantitatively evaluating a reliability of an output result of each sensor at each moment on the basis of a model for an output of each sensor under a normal operation; mutually diagnosing the sensors for extracting shared representation between the sensors and quantitatively evaluating a normal-operation reliability of the output result of each sensor on the basis of the extracted shared representation; and integrally diagnosing for quantitatively evaluating a final reliability of each of the sensors on the basis of output results of the diagnosing of each of the sensors and the mutually diagnosing of the sensors.

The diagnosing of each of the sensors may include: compressing the outputs of the sensors output at each time into feature vectors; measuring individual input reliability for measuring the reliability of the sensor on the basis of each of the feature vectors; measuring dynamic information reliability for measuring the reliability of the sensor on the basis of a dynamic relationship between the feature vectors generated consecutively; and measuring final reliability for quantitatively evaluating the final reliability on the basis of output results of the measuring of the input reliability and the measuring of the dynamic information reliability.

The mutually diagnosing of the sensors may include: extracting shared representation for extracting shared representation from the sensors except for a verification target sensor; predicting the output of the sensor for returning an output prediction value that is expected to be output from the verification target sensor from the extracted shared representation; and verifying the output of the sensor for calculating the final reliability by comparing a result obtained from the sensor output prediction with an actual output for the verification target sensor.

BRIEF DESCRIPTION OF THE DRAWINGS

Example embodiments of the present invention will become more apparent by describing example embodiments of the present invention in detail with reference to the accompanying drawings, in which.

DETAILED DESCRIPTION

Hereinafter, exemplary embodiments of an apparatus and method for fault diagnosis and back-up of advanced driver assistance system (ADAS) sensors based on deep learning according to the present invention will be described in detail.

The features and advantages of the apparatus and method for fault diagnosis and back-up of ADAS sensors based on deep learning according to the present invention will become more apparent by describing exemplary embodiments thereof in detail.

Figure 1:
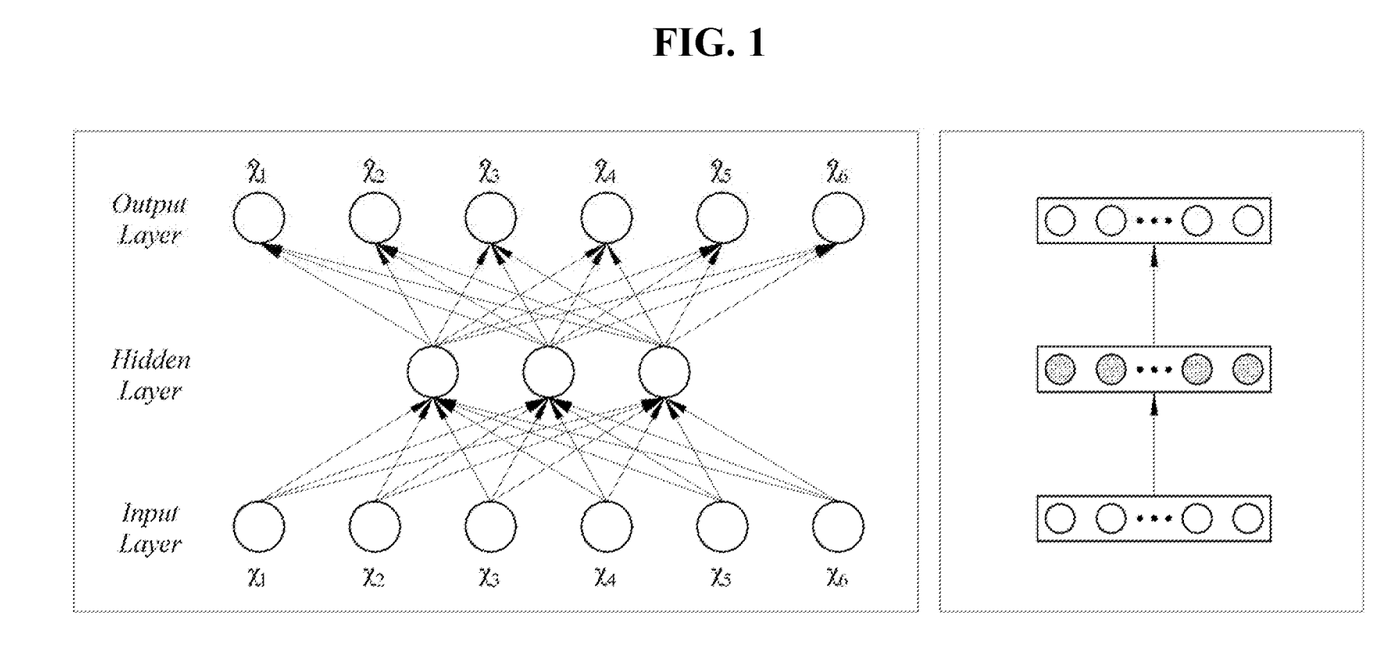
FIG. 1 is a block diagram illustrating an example of an auto encoder.

FIG. 1 is a block diagram illustrating an example of an auto encoder.

Figure 2:
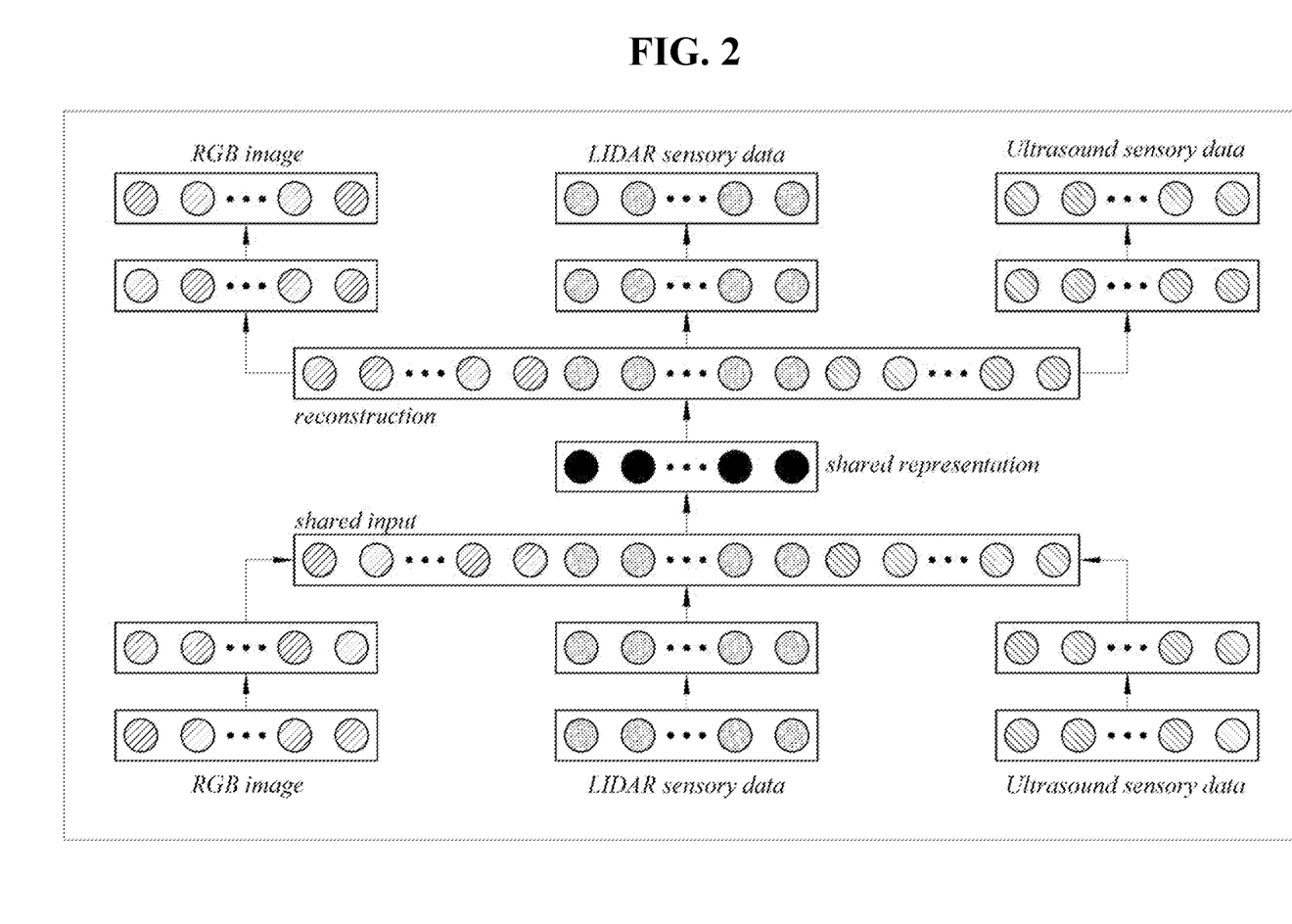
FIG. 2 is a block diagram illustrating an example of a multi-modal deep auto-encoder (MMDAE) for a vehicle.

In addition, FIG. 2 is a block diagram illustrating an example of a multi-modal deep auto-encoder (MMDAE) for a vehicle.

The apparatus and method for fault diagnosis and back-up of ADAS sensors based on deep learning according to the present invention are provided to perform efficient and comprehensive sensor verification using a mutual verification method through information shared between the sensors, to thereby cope with various environmental situations and fault situations.

To this end, the present invention may include a sensor fault diagnosis configuration that determines a normal operation of a main sensor of ADAS on the basis of a probability statistical approach.

The present invention may include a sensor complementation configuration that predicts a normal output of the faulty sensor using normal-operation sensors, except for the sensor, when a faulty sensor is found during operation of an ADAS function.

The present invention may include a configuration that introduces a model for an output of each sensor under a normal operation, and quantitatively evaluates a reliability of an output result of the sensor at each moment on the basis of the introduced model with a value ranging from 0 to 1.

The present invention includes a configuration that applies a normal-operation reliability of each sensor measured through an individual sensor diagnosis to an inter-sensor mutual diagnosis algorithm and reduces an influence of a sensor that is measured to have a low reliability in the individual sensor diagnosis on an process of extracting shared representation between the sensors, to thereby minimize the influence of the sensor on the determination of reliabilities of other sensors that operate normally.

The apparatus for fault diagnosis and back-up of ADAS sensors based on deep learning according to the present invention includes an individual sensor diagnosis unit that introduces a model for an output of each sensor under a normal operation and quantitatively evaluates a reliability of a sensor output result of each moment on the basis of the introduced model with a value ranging from 0 to 1, an inter-sensor mutual diagnosis unit that extracts shared representation between the sensors and quantitatively evaluates a normal-operation reliability of an output result of each sensor on the basis of the extracted shared representation with a value ranging from 0 to 1, and an integrated diagnosis unit that quantitatively evaluates a final reliability of each main sensor on the basis of output results of the individual sensor diagnosis unit and the inter-sensor mutual diagnosis unit.

An auto-encoder (AE), which is one type of artificial neural network as shown in FIG. 1, is useful for establishing an efficient information compression method for input data on the basis of massive learning data, and operates to extract high dimensional (or conceptual) information contained in input data in the information compression process. Therefore, the AE is widely used in the field of denoising and reconstruction.

FIG. 2 is a block diagram illustrating an example of an MMDAE for a vehicle, which is a type of an AE among deep learning algorithms and has various types of input data and a complex structure.

This provides high performance in extracting shared representation existing between pieces of multi-type input data and in inferring the original value of a missing or contaminated input value on the basis of the extracted shared representation.

The present invention uses MMDAE to detect an abnormal operation of various sensors used in ADAS and complement the corresponding sensor.

An operation error of the ADAS sensor may occur in the following situations.

ADAS may discriminate a mechanical malfunction of the sensor, but may not discriminate the following sensor errors.

There are error situations including occlusion by foreign substance, such as snow and rain, an abnormal operation due to external disturbance, such as backlighting or illumination, and errors in an inference process such as pedestrian detection.

The sensor fault diagnosis techniques of today use a method of determining a fault with respect to a fixed list of items having a finite number of cases, thus having difficulty in fully coping with faults that occur with an infinite number of combinations in various situations.

Particularly, in the field where the reasoning is involved in a cognition process, such as a pedestrian detection process, a simple rule or positive type fault diagnosis is less effective.

In order to remove the above drawbacks, the present invention is provided to cope with various environmental situations and fault situations by determining the presence of a fault of each sensor on the basis of deep understanding of surrounding environments identified through multi sensors, rather than performing diagnosis on the basis of a predetermined fault list.

The present invention operates in a multi-modal sensor network that combines multi-type sensors, and includes an individual sensor diagnosis configuration, an inter-sensor mutual diagnosis configuration, and an integrated diagnosis configuration.

In addition, the present invention includes a sensor reconstruction configuration for back-up of a faulty sensor that, on the basis of information about sensors having no fault, calculates a prediction value expected to be output from a faulty sensor when the faulty sensor operates normally.

The construction of the apparatus for fault diagnosis and back-up of ADAS sensors based on deep learning according to the present invention is as follows.

Figure 3:
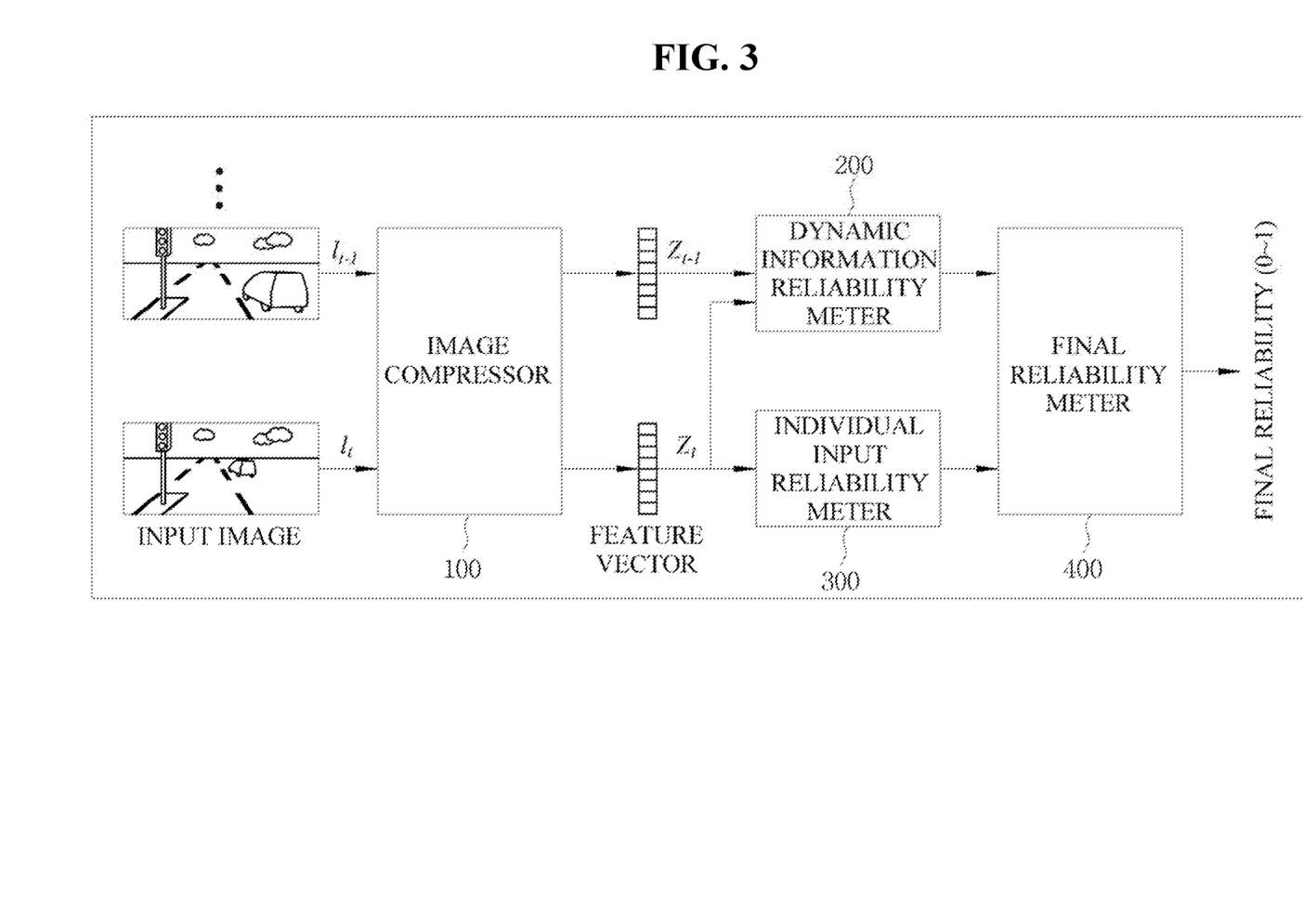
FIG. 3 is a block diagram illustrating an apparatus for fault diagnosis and back-up of ADAS sensors based on deep learning according to the present invention.

FIG. 3 is a block diagram illustrating an apparatus for fault diagnosis and back-up of ADAS sensors based on deep learning according to the present invention.

The apparatus for fault diagnosis and back-up of ADAS sensors based on deep learning according to the present invention introduces a model for an output of each sensor under a normal operation, and quantitatively evaluates a reliability of an output result of the sensor at each moment on the basis of the introduced model with a value ranging from 0 to 1, so that an individual sensor diagnosis is performed.

Referring to FIG. 3, the apparatus for fault diagnosis and back-up of ADAS sensors based on deep learning according to the present invention includes an information compressor 100 configured to compress an output of a high level sensor output at each time into a low level feature vector, an individual input reliability meter 300 configured to measure a reliability of a sensor on an individual feature vector, a dynamic information reliability meter 200 configured to measure a reliability of a sensor on the basis of a dynamic relationship between feature vectors generated consecutively, and a final reliability meter 400 configured to quantitatively evaluate a final reliability on the basis of output results of the individual input reliability meter 300 and the dynamic information reliability meter 200.

Here, in an implementation, the information compressor 100 may be combined with a configuration of an AE, which has strengths for data compression, and a configuration of a convolutional neural network (CNN), which has strengths for image data compression, among deep learning models.

Further, the individual input reliability meter 300 may use multi-layer perceptron which has strengths for non-linear inference.

In addition, the dynamic information reliability meter 200 may employ a long short-term memory (LSTM) structure of a recurrent neural network (RNN) which exhibits the highest performance in analysis of time series data among deep learning models.

In order to evaluate the performance of a sensor fault diagnosis algorithm, the present invention may measure a detection rate for items of a fault situation including a sensor blackout and a data update delay of individual sensors, a sensor occlusion by a foreign substance, and a backlight occurrence item of a camera sensor, and the present invention is not limited thereto.

A sensor complementation algorithm includes reconstruction of an output of a depth camera, and includes a configuration to reconstruct a depth region from information of image camera operating normally and to determine a normal reconstruction depending on whether a difference between a reconstructed depth and an actual depth for each pixel falls within a predetermined range.

The inter-sensor mutual diagnosis configuration in the apparatus for fault diagnosis and back-up of ADAS sensors based on deep learning according to the present invention is as follows.

Figure 4:
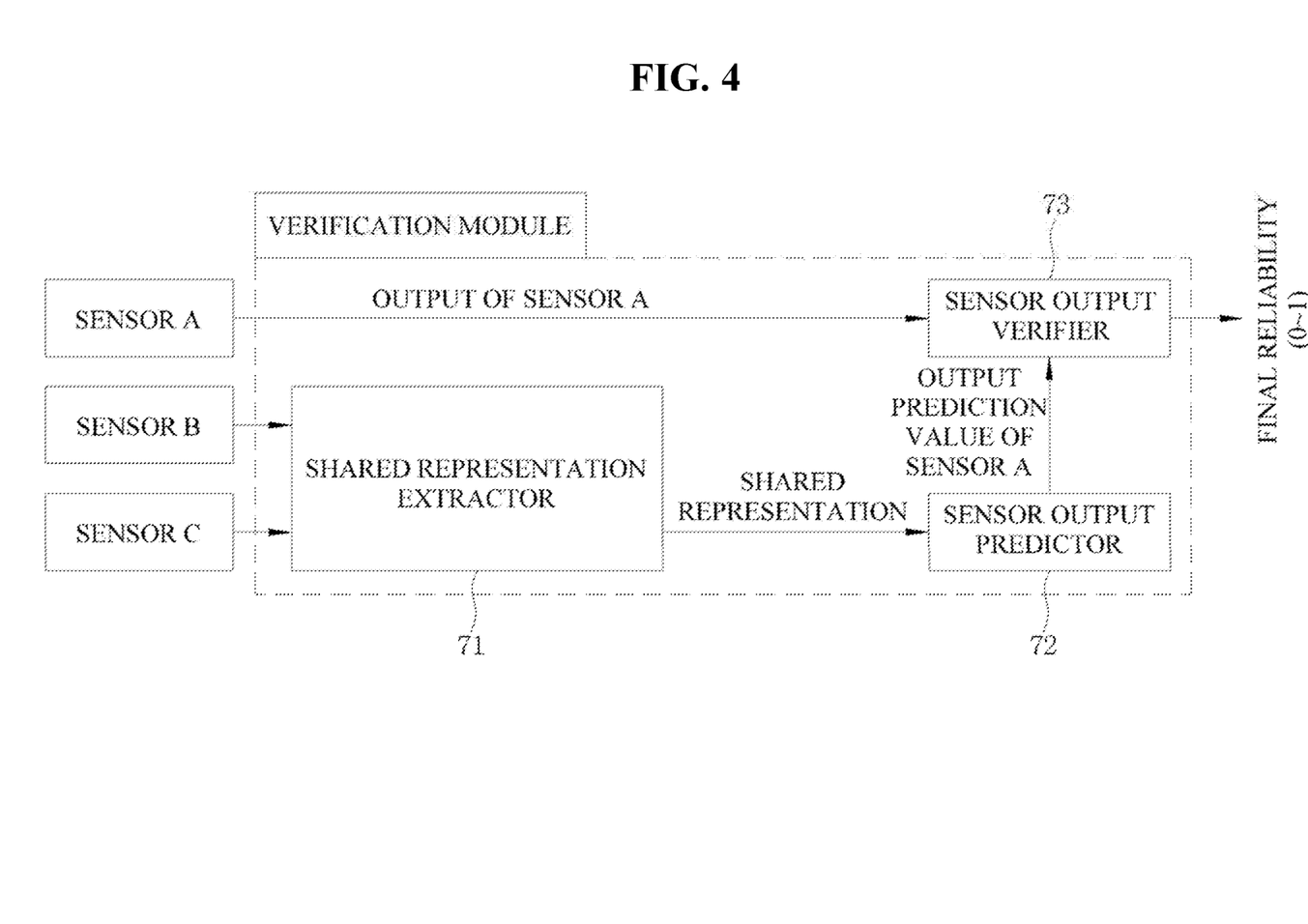
FIG. 4 is a block diagram illustrating a verification module for inter-sensor mutual diagnosis according to the present invention.

FIG. 4 is a block diagram illustrating a verification module for inter-sensor mutual diagnosis according to the present invention.

In order to perform inter-sensor mutual diagnosis, the present invention includes a configuration to extract shared representation between the sensors and quantitatively evaluate a normal-operation reliability of an output result of each sensor on the basis of the extracted shared representation with a value ranging from 0 to 1.

To this end, referring to FIG. 4, the present invention includes a shared representation extractor 71 configured to extract shared representation from sensors except for a verification target sensor, a sensor output predictor 72 configured to return an output prediction value that is expected to be output from the verification target sensor from the extracted shared representation, and a sensor output verifier 73 configured to calculate a final reliability by comparing a result obtained from the sensor output predictor 72 with an actual output for the verification target sensor.

Here, in an implementation, the shared representation extractor 71 may have an MMDAE structure which has strengths for analysis of non-linear relationship between pieces of data.

The sensor output predictor 72 learns the MMDAE used in the shared representation extractor 71 in a denoising method such that the MMDAE has an output value without an input of a corresponding sensor, to thereby obtain an approximate output value of a sensor desired to be predicted.

The sensor output verifier 73, in order to prevent a sensor output and a result value of the sensor output predictor 72 from mismatching each other due to an output error of the MMDAE based algorithm even when the sensor operates normally, has a multi-layer perceptron based regressor structure to calculate a reliability according to a difference between the sensor output and the result value of the sensor output predictor 72.

Figure 5:
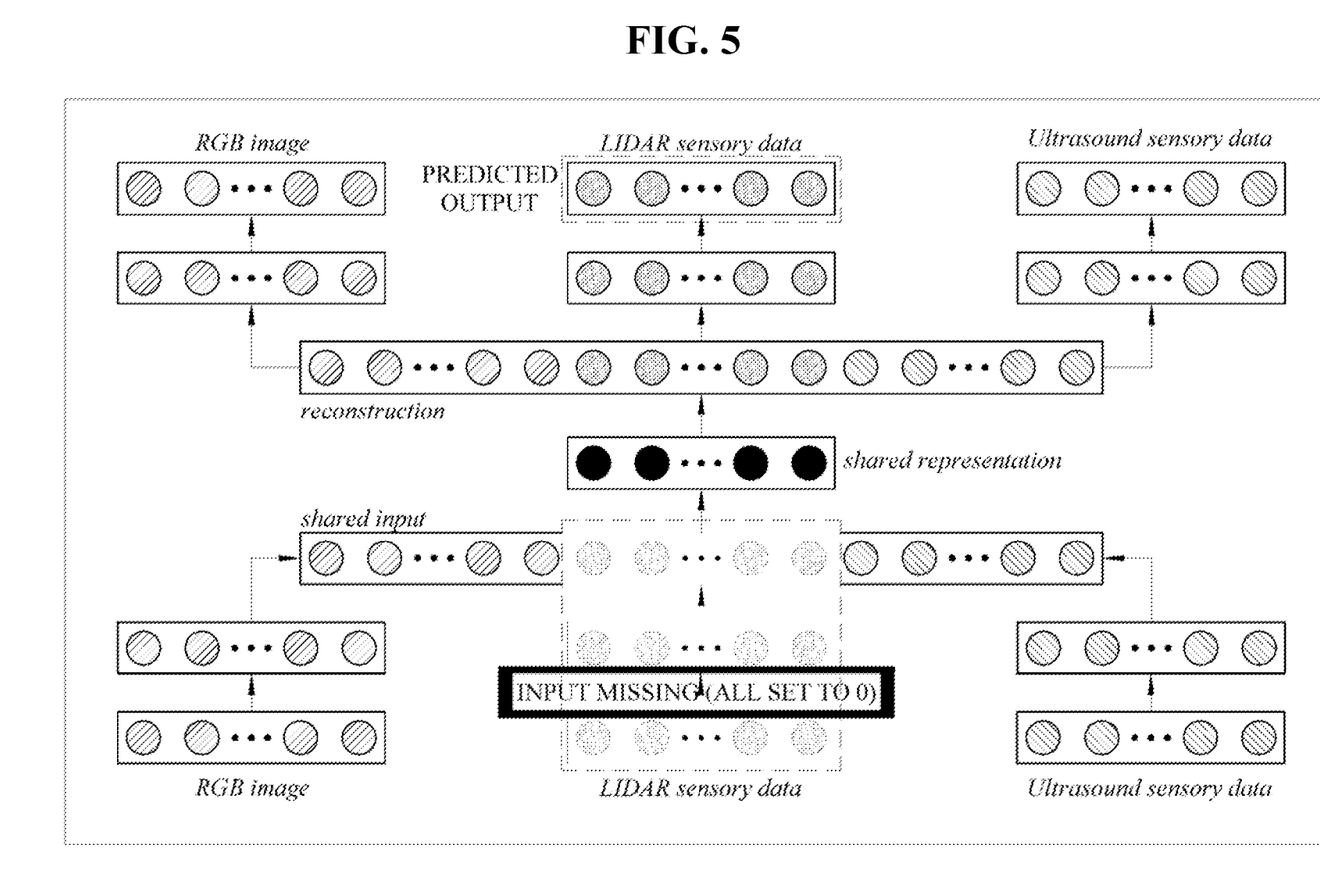
FIG. 5 is a block diagram illustrating an outline of a sensor output prediction.

FIG. 5 is a block diagram illustrating an outline of a sensor output prediction.

The apparatus for fault diagnosis and back-up of ADAS sensors based on deep learning according to the present invention includes an integrated diagnosis configuration.

The integrated diagnosis configuration according to the present invention quantitatively evaluates a final reliability of each main sensor on the basis of output results of the individual sensor diagnosis configuration and the inter-sensor mutual diagnosis configuration with a value ranging from 0 to 1.

To this end, the integrated diagnosis configuration applies a normal-operation reliability of each sensor measured in the individual sensor diagnosis algorithm to the inter-sensor mutual diagnosis algorithm, so that a diagnosis system having a high reliability is constructed.

In other words, with regard to a sensor measured to have a low reliability in the individual sensor diagnosis algorithm, the integrated diagnosis configuration reduces the influence of the sensor on the process of extracting shared representation between the sensors to minimize the influence of the sensor on the determination of the reliabilities of other sensors operating normally, thereby increasing the accuracy of reliability determination.

The method for fault diagnosis and back-up of ADAS sensors based on deep learning according to the present invention will be described in detail as follows.

The method for fault diagnosis and back-up of ADAS sensors based on deep learning according to the present invention includes diagnosing each sensor for quantitatively evaluating a reliability of an output result of each sensor at each moment on the basis of a model for an output of each sensor under a normal operation; mutually diagnosing the sensors for extracting shared representation between the sensors and quantitatively evaluating a normal-operation reliability of the output result of each sensor on the basis of the extracted shared representation; and integrally diagnosing for quantitatively evaluating a final reliability of each of the sensors on the basis of output results of the diagnosing of each of the sensors and the mutually diagnosing of the sensors.

Here, the diagnosing of each of the sensors may include: compressing the outputs of the sensors output at each time into feature vectors; measuring individual input reliability for measuring the reliability of the sensor on the basis of each of the feature vectors; measuring dynamic information reliability for measuring the reliability of the sensor on the basis of a dynamic relationship between the feature vectors generated consecutively; and measuring final reliability for quantitatively evaluating the final reliability on the basis of output results of the measuring of the input reliability and the measuring of the dynamic information reliability.

In addition, the mutually diagnosing of the sensors may include: extracting shared representation for extracting shared representation from the sensors except for a verification target sensor; predicting the output of the sensor for returning an output prediction value that is expected to be output from the verification target sensor from the extracted shared representation; and verifying the output of the sensor for calculating the final reliability by comparing a result obtained from the sensor output prediction with an actual output for the verification target sensor.

Figure 6:
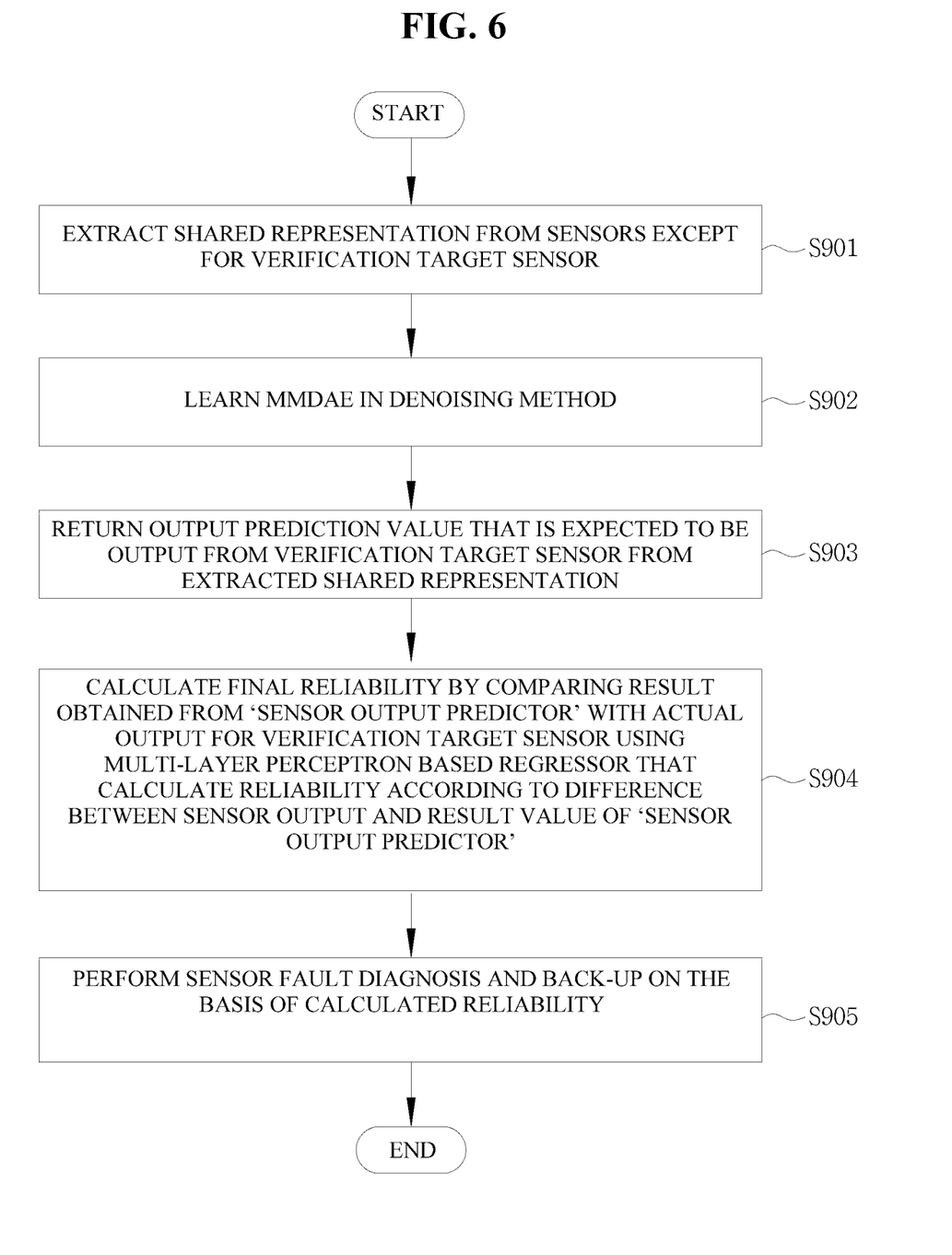
FIG. 6 is a flowchart showing a method for fault diagnosis and back-up of ADAS sensors based on deep learning according to the present invention.

FIG. 6 is a flowchart showing a method for fault diagnosis and back-up of ADAS sensors based on deep learning according to the present invention.

First, shared representation information is extracted from sensors except for a verification target sensor (S901).

Then, an MMDAE is trained in a denoising method (S902), and an output prediction value that is expected to be output from the verification target sensor is returned from the extracted shared representation (S903).

Then, a final reliability is calculated by comparing the sensor output prediction result and an actual output for the verification target sensor using a multi-layer perceptron based regressor (S904).

Then, a fault diagnosis and a back-up are formed on the basis of the calculated reliability (S905).

The apparatus and method for fault diagnosis and back-up of ADAS sensors based on deep learning according to the present invention described above are provided to perform efficient and comprehensive sensor verification using a mutual verification method through information shared between the sensors, to thereby cope with various environmental situations and fault situations.

As is apparent from the above, the apparatus and method for fault diagnosis and back-up of ADAS sensors based on deep learning according to the present invention have the following effects.

First, the apparatus and method for fault diagnosis and back-up of ADAS sensors based on deep learning according to the present invention can perform efficient and comprehensive sensor verification using a mutual verification method through information shared between the sensors.

Second, the apparatus and method for fault diagnosis and back-up of ADAS sensors based on deep learning according to the present invention can cope with various environmental situations and fault situations by determining a presence of a fault in each sensor on the basis of deep understanding of surrounding environment recognized through multi sensors, rather than performing diagnosis on the basis of a predetermined fault list.

Third, the apparatus and method for fault diagnosis and back-up of ADAS sensors based on deep learning according to the present invention can increase the accuracy of sensor fault diagnosis by using a sensor fault diagnosis configuration that determines a normal operation of a main sensor of ADAS on the basis of a probability statistical approach.

Fourth, the apparatus and method for fault diagnosis and back-up of ADAS sensors based on deep learning according to the present invention can increase the reliability of ADAS by applying a sensor complement configuration that predicts a normal output of the faulty sensor using normal-operation sensors, except for the sensor, when a faulty sensor is found during operation of an ADAS function.

Fifth, the apparatus and method for fault diagnosis and back-up of ADAS sensors based on deep learning according to the present invention can increase the accuracy of individual sensor diagnosis by introducing a model for an output of each sensor under a normal operation and quantitatively evaluating a reliability of a sensor output result at each moment on the basis of the introduced model with a value ranging from 0 to 1.

Sixth, the apparatus and method for fault diagnosis and back-up of ADAS sensors based on deep learning according to the present invention can construct a high reliability diagnosis system by applying a normal-operation reliability of each sensor that is measured by an individual sensor diagnosis to an inter-sensor mutual diagnosis algorithm.

Seventh, the apparatus and method for fault diagnosis and back-up of ADAS sensors based on deep learning according to the present invention can achieve the accuracy of determination by reducing an influence of a sensor that is measured to have a low reliability in an individual sensor diagnosis on a process of extracting shared representation between the sensors, to minimize the influence of the sensor on the determination of reliabilities of other sensors that operate normally.

Those skilled in the art should appreciate that various modifications, changes, and substitutions thereto are possible without departing from the scope and spirit of the invention as described above.

Therefore, the exemplary embodiments disclosed in the present invention and the accompanying drawings are intended to illustrate and not limit the technical spirit of the present invention. The scope of the invention is set forth in the following claims rather than the above specification, and it is intended that the present invention covers all modifications provided they come within the scope of the appended claims and their equivalents.

What is claimed is:

1. An apparatus for fault diagnosis and back-up of a plurality of advanced driver assistance system (ADAS) sensors based on deep learning, the apparatus comprising:
   circuitry configured to
      compress an output of one sensor of the plurality of sensors into feature vectors;
      measure an individual reliability of the one sensor based on each of the feature vectors;

measure a dynamic reliability of the one sensor on the basis of a dynamic relationship between the feature vectors generated consecutively;

quantitatively evaluate a value of a reliability of an output of the one sensor, on the basis of the individual reliability and the dynamic reliability, to be within a predetermined range of values;

extract a shared representation between other sensors of the plurality of sensors and quantitatively evaluate a value of a normal-operation reliability of the output of the one sensor under an operation without faults on the basis of the extracted shared representation;

quantitatively evaluate a final reliability of the one sensor on the basis of the value of the reliability of the output of the one sensor and the value of the normal-operation reliability of the output of the one sensor; and extract, based on the value of the reliability of the output of the one sensor, a shared representation between the one sensor and another sensor of the plurality of sensors by reducing a weight of the one sensor so that an influence of the one sensor is minimized when determining reliabilities of sensors of the plurality of sensors other than the one sensor.

2. The apparatus of claim 1, wherein the apparatus operates in a multi-modal sensor network that combines multi-type sensors.

3. The apparatus of claim 1, wherein the circuitry has a configuration of an auto-encoder for data compression and a configuration of a convolutional neural network (CNN) for image data compression.

4. The apparatus of claim 1, wherein the individual reliability of the one sensor is measured based on a multi-layer perceptron for non-linear inference.

5. The apparatus of claim 1, wherein the dynamic reliability of the one sensor is measured based on a long short-term memory (LSTM) structure of a recurrent neural network (RNN).

6. The apparatus of claim 1, wherein the circuitry measures a detection rate for items of a fault situation including a sensor blackout and a data update delay of each sensor of the plurality of sensors, a sensor occlusion by a foreign substance, and a backlight occurrence of a camera sensor.

7. The apparatus of claim 1, wherein a depth camera and an image camera include the plurality of sensors, and wherein the apparatus performs reconstruction of an output of the depth camera for sensor complementation, and further includes a configuration which reconstructs a depth region from information of the image camera operating without faults and determines the reconstruction depending on whether a difference between a reconstructed depth and an actual depth for each pixel falls within a predetermined range.

8. The apparatus of claim 1, wherein the circuitry is further configured to:

extract a shared representation from the plurality of sensors except for the one sensor;

return an output prediction value that is expected to be output from the one sensor from the extracted shared representation from the plurality of sensors except for the one sensor; and calculate the normal-operation reliability by comparing the output prediction value with the output of the one sensor.

9. The apparatus of claim 8, wherein the circuitry has a multi-modal deep auto-encoder (MMDAE) structure.

10. The apparatus of claim 9, wherein the circuitry configures the MMDAE using a denoising method such that the MMDAE has an output value without an input of a corresponding sensor, to thereby obtain an output value of the one sensor.

11. The apparatus of claim 8, wherein, to prevent the output of the one sensor and the output prediction value from mismatching each other due to an output error of an MMDAE based algorithm, the circuitry has a multi-layer perceptron based regressor structure that calculates the reliability of the one sensor according to a difference between the output of the one sensor and the output prediction value.

12. A method for fault diagnosis and back-up of a plurality of advanced driver assistance system (ADAS) sensors based on deep learning, in a multi-modal sensor network that combines multi-type sensors, the method comprising:

compressing an output of one sensor of the plurality of sensors into feature vectors;

measuring an individual reliability of the one sensor based on each of the feature vectors;

measuring a dynamic reliability of the one sensor on the basis of a dynamic relationship between the feature vectors generated consecutively;

quantitatively evaluating a value of a reliability of an output of the one sensor, on the basis of the individual reliability and the dynamic reliability, to be within a predetermined range of values;

extracting a shared representation between other sensors of the plurality of sensors and quantitatively evaluating a value of a normal-operation reliability of the output of the one sensor under an operation without faults on the basis of the extracted shared representation;

quantitatively evaluating a final reliability of the one sensor on the basis of the value of the reliability of the output of the one sensor and the value of the normal-operation reliability of the output of the one sensor; and extracting, based on the value of the reliability of the output of the one sensor, a shared representation between the one sensor and another sensor of the plurality of sensors by reducing a weight of the one sensor so that an influence of the one sensor is minimized when determining reliabilities of sensors of the plurality of sensors other than the one sensor.

13. The method of claim 12, further comprising:

extracting a shared representation from the plurality of sensors except for the one sensor;

predicting the output of the one sensor for returning an output prediction value that is expected to be output from the one sensor from the extracted shared representation from the plurality of sensors except for the one sensor; and verifying the output of the one sensor for calculating the normal-operation reliability by comparing a result obtained from the sensor output prediction with the output of the one sensor.

* * * * *